US008817818B2

(12) United States Patent
Onggosanusi et al.

(10) Patent No.: US 8,817,818 B2
(45) Date of Patent: Aug. 26, 2014

(54) BACKWARD COMPATIBLE BANDWIDTH EXTENSION

(75) Inventors: Eko N. Onggosanusi, Allen, TX (US); Anand G. Dabak, Allen, TX (US); Badri Varadarajan, Dallas, TX (US); Runhua Chen, Dallas, TX (US); Tarik Muharemovic, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 207 days.

(21) Appl. No.: 12/427,124

(22) Filed: Apr. 21, 2009

(65) Prior Publication Data
US 2009/0268831 A1    Oct. 29, 2009

Related U.S. Application Data

(60) Provisional application No. 61/047,294, filed on Apr. 23, 2008, provisional application No. 61/048,698, filed on Apr. 29, 2008.

(51) Int. Cl.
*H04J 3/16* (2006.01)
*H04J 11/00* (2006.01)

(52) U.S. Cl.
USPC .......................................... 370/468; 370/203

(58) Field of Classification Search
CPC .................................... H04J 3/16; H04J 11/00
USPC ............. 370/468, 395.21, 203, 208.209, 328, 370/329, 319, 344, 337, 431, 442, 465, 445, 370/236, 281, 295; 455/450, 455
See application file for complete search history.

(56) References Cited

U.S. PATENT DOCUMENTS

| | | | | |
|---|---|---|---|---|
| 6,385,190 | B1* | 5/2002 | Malkamaki et al. | 370/347 |
| 7,564,823 | B2* | 7/2009 | Pecen et al. | 370/337 |
| 7,957,346 | B2* | 6/2011 | Nabetani | 370/329 |
| 2005/0190724 | A1 | 9/2005 | Hansen et al. | |
| 2006/0002361 | A1 | 1/2006 | Webster et al. | |
| 2006/0146869 | A1 | 7/2006 | Zhang et al. | |
| 2006/0209894 | A1* | 9/2006 | Tzannes et al. | 370/468 |
| 2006/0211426 | A1* | 9/2006 | Costa et al. | 455/450 |
| 2007/0067163 | A1* | 3/2007 | Kabal et al. | 704/207 |

FOREIGN PATENT DOCUMENTS

EP          01622290          2/2006

OTHER PUBLICATIONS

"LTE-Advanced—Evolving LTE Towards IMT-Advanced", Stefan Parkvall,et al., Vehicular Technology Conference, 2008-Fall, IEEE 68th, pp. 1-5.

* cited by examiner

*Primary Examiner* — Hanh N Nguyen
(74) *Attorney, Agent, or Firm* — Ronald O. Neerings; Frederick J. Telecky, Jr.

(57) ABSTRACT

A transmitter includes a bandwidth configuration unit configured to provide an increased system bandwidth corresponding to a bandwidth extension over multiple component carriers. Additionally, the transmitter also includes a transmit unit configured to employ the bandwidth extension.

26 Claims, 4 Drawing Sheets

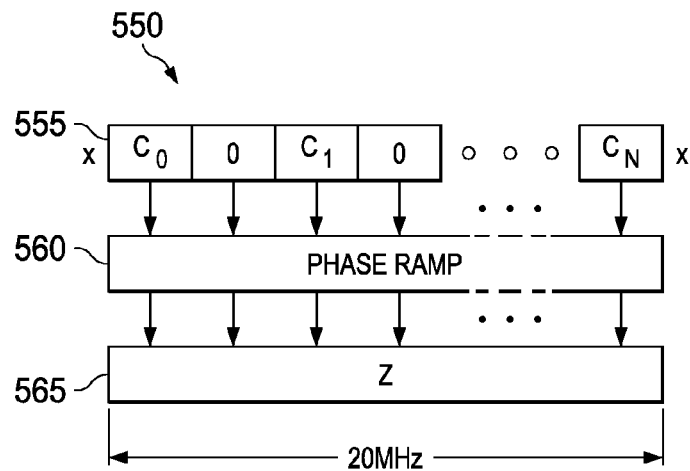
FIG. 5B
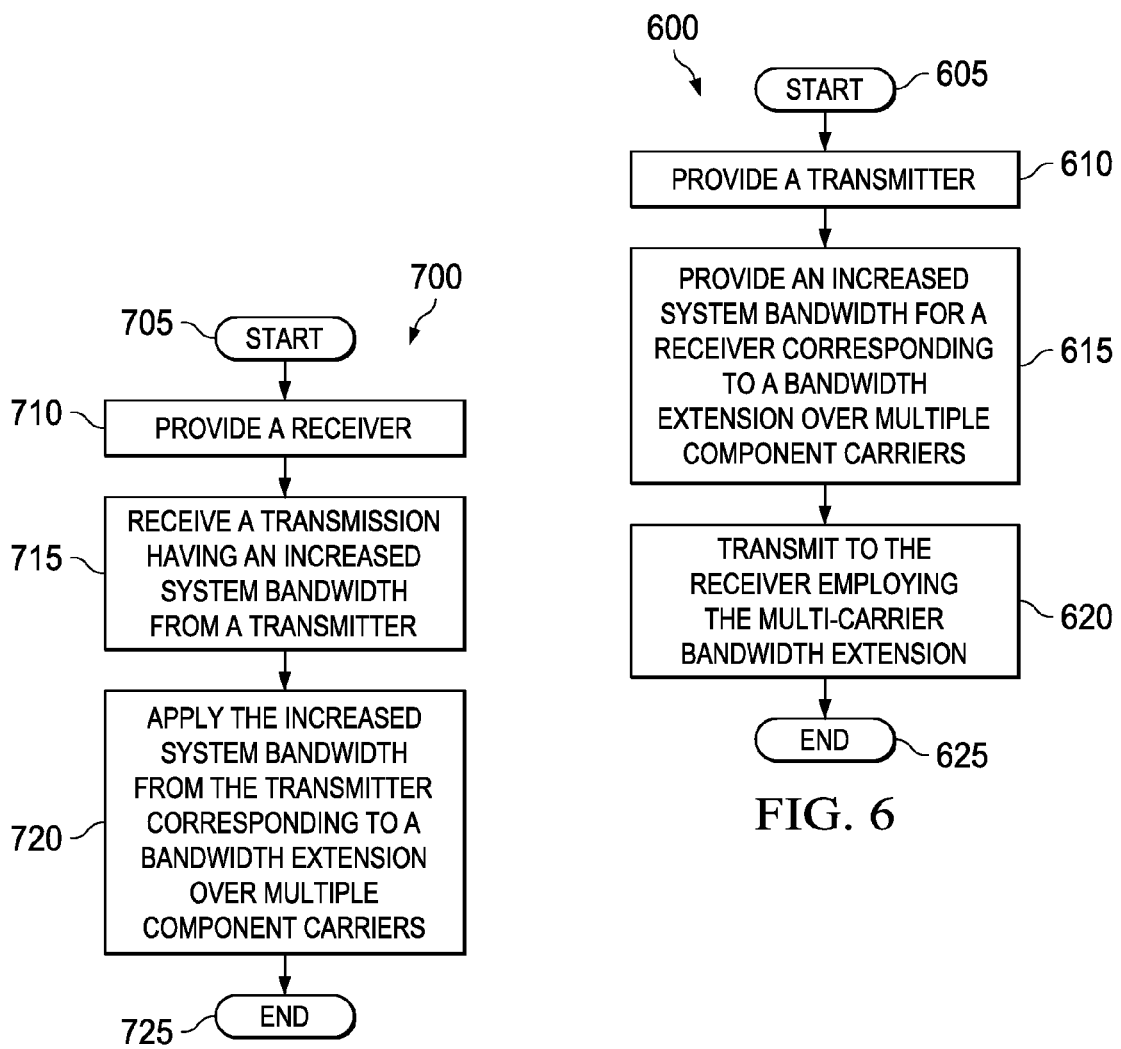
FIG. 6
FIG. 7

BACKWARD COMPATIBLE BANDWIDTH EXTENSION

CROSS-REFERENCE TO PROVISIONAL APPLICATION

This application claims the benefit of U.S. Provisional Application No. 61/047,294, filed by Eko N. Onggosanusi, Anand G. Dabak, Badri Varadarajan, Runhua Chen and Tarik Muharemovic on Apr. 23, 2008, entitled "Backward Compatible Bandwidth Extension" commonly assigned with this application and incorporated herein by reference.

This application also claims the benefit of U.S. Provisional Application No. 61/048,698, filed by Eko N. Onggosanusi, Anand G. Dabak, Badri Varadarajan, Runhua Chen and Tarik Muharemovic on Apr. 29, 2008, entitled "Backward Compatible Bandwidth Extension" commonly assigned with this application and incorporated herein by reference.

TECHNICAL FIELD

The present disclosure is directed, in general, to a communication system and, more specifically, to a transmitter, a receiver and methods of operating a transmitter and a receiver.

BACKGROUND

In a cellular network, such as one employing orthogonal frequency division multiple access (OFDMA), each cell employs a base station that communicates with user equipment, such as a cell phone or a laptop that is actively located within its cell. MIMO communication systems offer large increases in throughput due to their ability to support multiple parallel data streams that are each transmitted from different antennas. These systems provide increased data rates and reliability by exploiting a spatial multiplexing gain or spatial diversity gain that is available in MIMO channels. Although transmission bandwidths are currently adequate, improvements in this area would be beneficial in the art.

SUMMARY

Embodiments of the present disclosure provide a transmitter, a receiver and methods of operating a transmitter and a receiver. In one embodiment, the transmitter includes a bandwidth configuration unit configured to provide an increased system bandwidth corresponding to a bandwidth extension over multiple component carriers. Additionally, the transmitter also includes a transmit unit configured to employ the bandwidth extension.

In another embodiment, the receiver includes a receive unit configured to receive a transmission having an increased system bandwidth. The receiver also includes a bandwidth adaptation unit configured to apply the increased system bandwidth corresponding to a bandwidth extension over multiple component carriers.

In another aspect, the method of operating a transmitter includes providing an increased system bandwidth corresponding to a bandwidth extension over multiple component carriers and transmitting in accordance to the bandwidth extension.

In yet another aspect, the method of operating a receiver includes receiving a transmission having an increased system bandwidth and applying the increased system bandwidth corresponding to a bandwidth extension over multiple component carriers.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which:

FIGS. 5A and 5B illustrate examples associated with a multi-carrier bandwidth extension that may be employed for sounding reference signal (SRS);

FIG. 6 illustrates a flow diagram of a method of operating a transmitter that is carried out according to the principles of the present disclosure; and FIG. 7 illustrates a flow diagram of a method of operating a receiver that is carried out according to the principles of the present disclosure.

DETAILED DESCRIPTION

Figure 1:
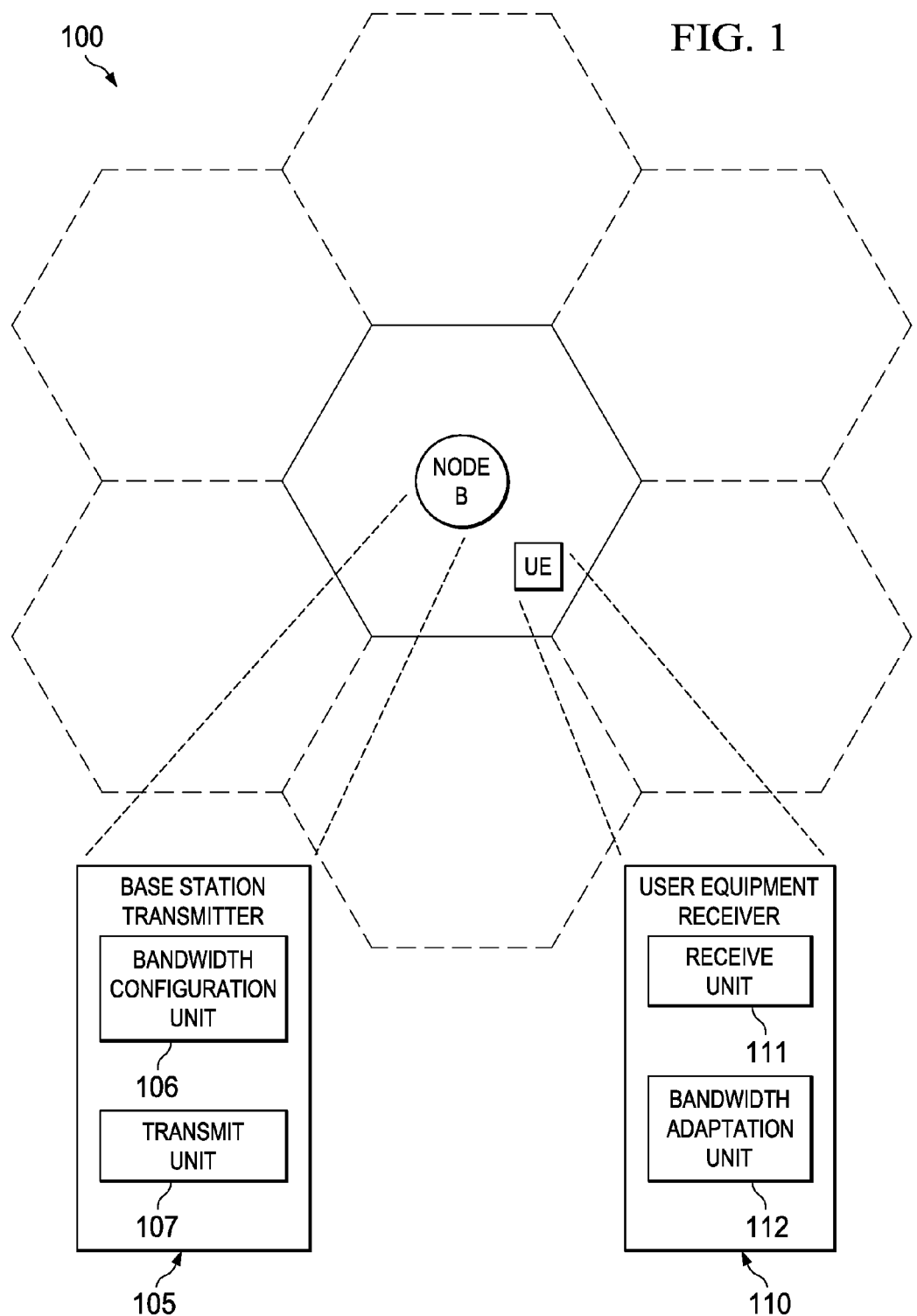
FIG. 1 illustrates an exemplary diagram of an embodiment of a cellular network constructed according to the principles of the present disclosure.

FIG. 1 illustrates an exemplary diagram of an embodiment of a cellular network 100 constructed according to the principles of the present disclosure. The cellular network 100 is part of an OFDMA system and includes a cellular grid having a centric cell and six surrounding first-tier cells. The centric cell employs a centric base station (NodeB), as shown.

The NodeB includes a base station transmitter 105 having a bandwidth configuration unit 106 and a transmit unit 107. The cellular network 100 also includes user equipment (UE) operating within the centric cell, wherein the NodeB acts as a serving base station to the UE. The UE includes a UE receiver 110 having a receive unit 111 and a bandwidth adaptation unit 112.

In the base station transmitter 105, the bandwidth configuration unit 106 provides an increased system bandwidth for the UE receiver 110 corresponding to a multi-carrier bandwidth extension. In such extension, each of the carriers is termed a component carrier. The transmit unit 107 employs the multi-carrier bandwidth extension for transmitting to the UE receiver 110. In the UE receiver 110, the receive unit 111 receives a transmission having the increased system bandwidth from the base station transmitter 105. The bandwidth adaptation unit 112 applies the increased system bandwidth from the base station transmitter 105 corresponding to the multi-carrier bandwidth extension.

Peak data rate requirements for International Mobile Telecommunication-Advanced (IMT-A) can be fulfilled by a multi-carrier extension of E-UTRA. A main issue is that a minimum UE reception requirement is 20 MHz for backward compatibility. Therefore, since some form of extension based on 20 MHz bandwidths seems advantageous, examples presented below employ 20 MHz bandwidths, although other bandwidths may be employed corresponding to the principles of the present disclosure.

Figure 2A:
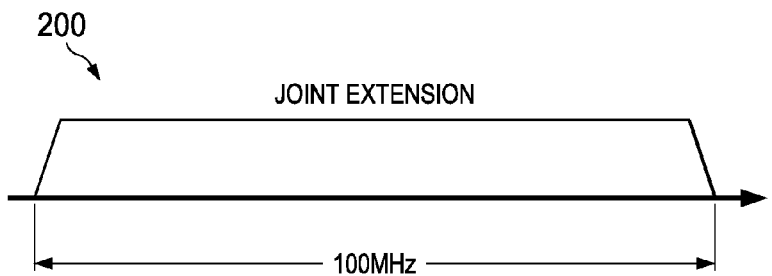
FIGS. 2A and 2B illustrate examples of multi-carrier bandwidth extensions of an increased system bandwidth as may be employed by a transmitter and receiver such as the NodeB transmitter and UE receiver of FIG. 1.
Figure 2B:
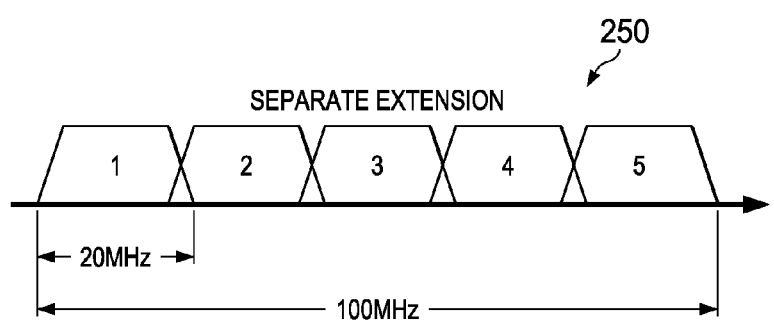

FIGS. 2A and 2B illustrate examples of multi-carrier bandwidth extensions of an increased system bandwidth as may be employed by a transmitter and receiver such as the NodeB transmitter and UE receiver of FIG. 1. In FIG. 2A, an example is shown of a multi-carrier bandwidth extension 200 that is a joint extension. The joint extension of this example covers a continuous 100 MHz bandwidth and jointly aggregates multiple contiguous component carriers into a single carrier of larger bandwidth. In FIG. 2B, an example is shown of a multi-carrier bandwidth extension 250 that includes separate extensions. The separate extensions of this example provide five contiguous component carriers of 20 MHz for a total bandwidth extension of 100 MHz. Separate extensions may also be applied for non-contiguous component carriers.

For a NodeB with higher system bandwidth, UEs with 20 MHz minimum reception capability may be semi-statically allocated only one 20 MHz component carrier. Additionally, examples supporting both joint and separate extensions are provided for flexibility. Table 1 contrasts various system aspects of joint and separate extensions.

TABLE 1

| System Aspects | Joint Extension | Separate Extension |
| --- | --- | --- |
| (1) PAPR/CM for UL | Lower | Higher |
| (2) Spectral efficiency | Potential increase (frequency scheduling, avoids "guard sub-carriers") | No increase |
| (3) Required extension in specification for higher bandwidth | Signaling support (CQI, DL control), RS definition, transport block definition) | Potential interaction across carriers |
| (4) Accommodating a minimum UE reception requirement of 20 MHz and LTE migration | Less flexible | More flexible. (Also allows non-contiguous 20 MHz allocations) |

A higher bandwidth extension requires the support of intra-frequency measurements to aid neighboring cell search and handover across different cells. Synchronization signals (and potentially PBCH) can be replicated on the edge of system bandwidth is another example. A downlink common reference signal (DL CRS) pattern may be repeated every 20 MHz within the system bandwidth. Other examples of what may be repeated include frequency domain patterns and RS sequences (pseudo-random binary sequences).

In any cellular communication systems, the transmission of control information is an integral part of the system design. Control information can be categorized into common control (a broadcast that is common to all UEs and typically cell-specific) and dedicated control (a broadcast that is UE-specific) control information. Examples of common control information include PCFICH (physical control format indicator channel) that carries the length or size of the control region in every subframe, DBCH (dynamic broadcast channel) that carries a system information block (SIB) and PDCCH (physical downlink control channel) that is a grant for DBCH. Examples of dedicated control information include PDCCH DL/UL grants, PHICH (physical hybrid ARQ indicator channel, which carries the downlink ACK/NAK corresponding to an UL transmission) and PUCCH (physical uplink control channel). Hence, the design of multi-carrier bandwidth extension needs to incorporate the mechanism for control information transmission.

Figure 3A:
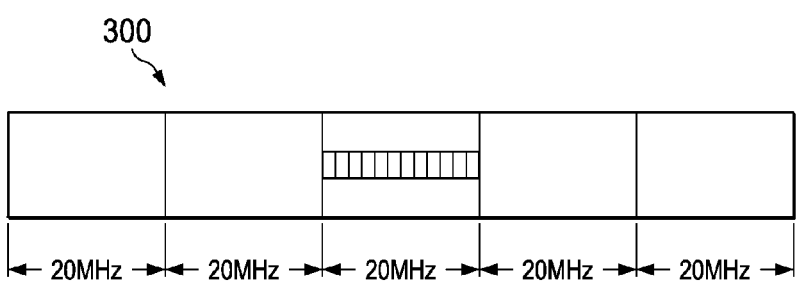
FIGS. 3A and 3B illustrate examples of common control information to support multi-carrier bandwidth extension.
Figure 3B:
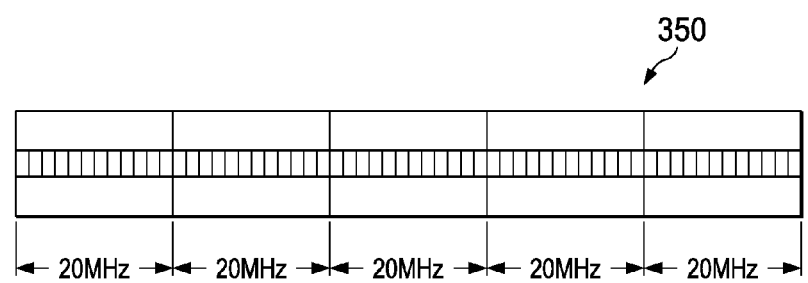

FIGS. 3A and 3B illustrate examples 300 and 350 of common control information to support multi-carrier bandwidth extension. First and second schemes are shown in FIGS. 3A and 3B, respectively. Table 2 contrasts various system aspects of two alternatives.

TABLE 2

| System Aspects | Scheme 1 | Scheme 2 |
| --- | --- | --- |
| (1) Illustration (example for 100 MHz system bandwidth) | One copy in a predetermined 20 MHz part (e.g., first or last 20 MHz part, center) | Replicate copies in every 20 MHz part |
| (2) Overhead | Lower | Higher |
| (3) UE complexity | Need to retune 20 MHz bandpass filter to read common control signals. This may introduce additional delay. | No extra complexity. This may allow simpler parallel processing. |

Scheme 2 may be preferred since PCFICH overhead is small, and SIB is spread across 80 ms.

Figure 4A:
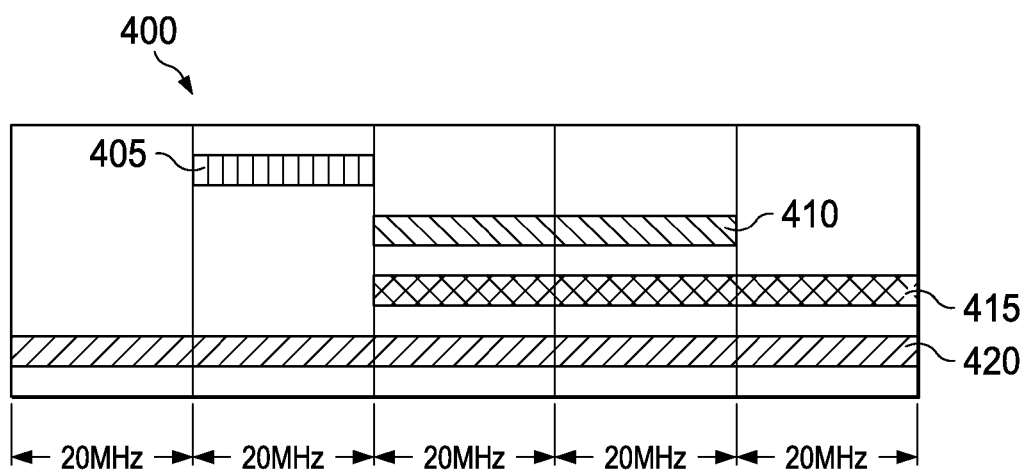
FIGS. 4A and 4B illustrate examples of a transmission of dedicated control information to support multi-carrier bandwidth extensions.
Figure 4B:
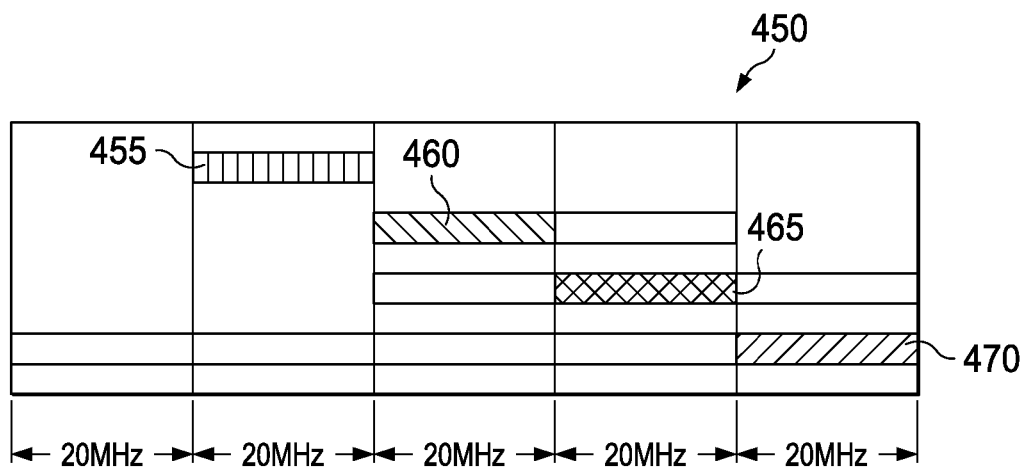

FIGS. 4A and 4B illustrate examples 400 and 450 of a transmission of dedicated control information to support multi-carrier bandwidth extensions. First and second schemes are shown in FIGS. 4A and 4B, respectively. Bandwidth allocations for specific UEs 405, 410, 415 and 420 are shown for a joint extension, and bandwidth allocations for specific UEs 455, 460, 465 and 470 are shown for separate extensions. Table 3 contrasts various system aspects of the two alternatives.

TABLE 3

| System Aspects | Scheme 1 | Scheme 2 |
| --- | --- | --- |
| (1) Illustration: example for 100 MHz system BW with 20 MHz, 40 MHz, 60 MHz, and 100 MHz UE reception BWs | Dedicated controls utilize the entire UE reception bandwidth | Dedicated controls utilize only a 20 MHz portion of the UE reception bandwidth |
| (2) Performance | Higher frequency diversity | Lower frequency diversity |
| (3) Flexibility | | More compatible with separate (especially non-contiguous) allocation |
| (4) Multiplexing | Multiplexing UEs with different reception bandwidths may be challenging | Easier, more flexible (20 MHz portion is treated as control channel resource) |

Scheme 2 may be preferred since frequency diversity beyond 20 MHz may not be beneficial for typical scenarios and it provides simpler multiplexing. For UEs with reception bandwidth that is greater than 20 MHz (or a multiple of 20 MHz), the 20 MHz portion for dedicated control transmission may be semi-statically configured by the NodeB (e.g., via dedicated RRC signaling). Additionally, it may be predetermined via a fixed rule. For example, as a function of the center frequency, UE reception bandwidth, system bandwidth or UE identity (RNTI).

Possible variations include combinations of Scheme 1 and Scheme 2. Some control channels may be transmitted with Scheme 1, and some other control channels may be transmitted with Scheme 2. For example: PHICH with Scheme 1 and PDCCH grants with Scheme 2. Furthermore, it is also possible to apply schemes intended for transmitting dedicated control for at least one of the common (broadcast) control parameters.

Figure 5A:
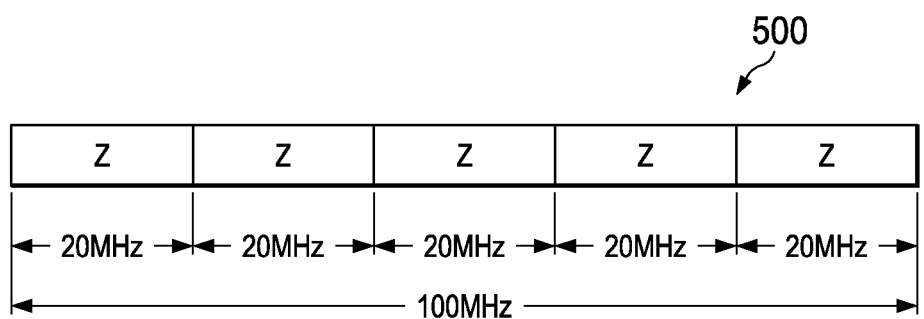

FIGS. 5A and 5B illustrate examples associated with a multi-carrier bandwidth extension, 500, 550 that may be employed for sounding reference signal (SRS) on the uplink. This part of the bandwidth extension actually applies to the uplink and downlink. However, the particular example illustrated applies only to an uplink sounding reference signal. Alternately, it may apply to any type of reference signals and bandwidth extension. For example, it may apply to an uplink demodulation reference signal and bandwidth extension. Alternately, it may apply to a downlink demodulation reference signal and bandwidth extension. It may apply to any backward compatible system, which has multiple component carriers. So essentially, with each component carrier a reference signal is being transmitted.

FIG. 5A shows an extension for a 100 MHz UE wherein a generated SRS sequence Z is repeated. This repetition is in the frequency domain, and for M multiples of 20 MHz, it is repeated M times. This approach may create a potential issue with PAPR, for example 100 MHz. FIG. 5B shows an example of how the reference signal Z for a 20 MHz UE reception bandwidth may be generated. A sequence 555 can be a Zadoff-Chu sequence or a pseudorandom CAZAC sequence, for example. A phase ramp 560 in the frequency domain corresponds to a cyclic shift in the time domain. The phase ramp 560 does not have to be the same for each reference signal Z. However, the sequence Z is the same.

FIG. 6 illustrates a flow diagram of a method 600 of operating a transmitter that is carried out according to the principles of the present disclosure. The method 600 starts in a step 605 and a transmitter is provided in a step 610. Then, in a step 615, an increased system bandwidth for a receiver is provided corresponding to a bandwidth extension over multiple component carriers. The bandwidth extension is employed in transmitting to the receiver, in a step 620.

In one embodiment, the bandwidth extension jointly aggregates multiple contiguous component carriers into a single carrier of larger bandwidth. In another embodiment, the bandwidth extension constitutes multiple separate contiguous or non-contiguous component carriers. In yet another embodiment, the bandwidth extension includes common control information that occupies only one component carrier or is replicated in all component carriers. In still another embodiment, the bandwidth extension includes dedicated control information that occupies at least one component carrier. In a further embodiment, the bandwidth extension corresponds to a sounding reference signal that is replicated in a portion of the multiple component carriers. The method 600 ends in a step 625.

FIG. 7 illustrates a flow diagram of a method 700 of operating a receiver that is carried out according to the principles of the present disclosure. The method 700 starts in a step 705 and a receiver is provided in a step 710. Then, in a step 715, a transmission having an increased system bandwidth is received from a transmitter. The increased system bandwidth from the transmitter is applied corresponding to a bandwidth extension over multiple component carriers, in a step 720.

In one embodiment, the bandwidth extension jointly aggregates multiple contiguous component carriers into a single carrier of larger bandwidth. In another embodiment, the bandwidth extension constitutes multiple separate contiguous or non-contiguous component carriers. In yet another embodiment, the bandwidth extension includes common control information that occupies only one component carrier or is replicated in all component carriers. In still another embodiment, the bandwidth extension includes dedicated control information that occupies at least one component carrier. In a further embodiment, the bandwidth extension corresponds to a sounding reference signal that is replicated in a portion of the multiple component carriers. The method 700 ends in a step 725.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. An apparatus, comprising:
 a bandwidth configuration unit configured to provide an increased bandwidth corresponding to a bandwidth extension over multiple component carriers wherein the bandwidth extension corresponds to a sounding reference signal that is replicated in a portion of the multiple component carriers; and
 a transmit unit configured to employ the bandwidth extension.

2. The apparatus as recited in claim 1 wherein the bandwidth extension jointly aggregates multiple contiguous component carriers into a single carrier of larger bandwidth.

3. The apparatus as recited in claim 1 wherein the bandwidth extension constitutes multiple separate non-contiguous component carriers.

4. The apparatus as recited in claim 1 wherein the bandwidth extension includes common control information that is replicated in all component carriers.

5. The apparatus as recited in claim 1 wherein the bandwidth extension includes dedicated control information that occupies only one component carrier.

6. The transmitter as recited in claim 1 wherein the bandwidth extension constitutes multiple separate contiguous component carriers.

7. The transmitter as recited in claim 1 wherein the bandwidth extension includes common control information that occupies only one component carrier.

8. The transmitter as recited in claim 1 wherein the bandwidth extension includes dedicated control information that occupies only one component carrier.

9. A method of operating a transmitter, comprising:
 providing an increased bandwidth corresponding to a bandwidth extension over multiple component carriers wherein the bandwidth extension corresponds to a sounding reference signal that is replicated in a portion of the multiple component carriers; and
 transmitting from said transmitter in accordance to the bandwidth extension.

10. The method as recited in claim 9 wherein the bandwidth extension includes common control information that is replicated in all component carriers.

11. The method as recited in claim 9 wherein the bandwidth extension includes dedicated control information that occupies only one component carrier.

12. The method as recited in claim 9 wherein the bandwidth extension includes common control information that occupies only one component carrier.

13. The method as recited in claim 9 wherein the bandwidth extension includes dedicated control information that occupies only one component carrier.

14. A receiver, comprising:
  a receive unit configured to receive a transmission having an increased bandwidth; and
  a bandwidth adaptation unit configured to apply the increased bandwidth corresponding to a bandwidth extension over multiple component carriers wherein the bandwidth extension corresponds to a sounding reference signal that is replicated in a portion of the multiple component carriers.

15. The receiver as recited in claim 14 wherein the bandwidth extension jointly aggregates multiple contiguous component carriers into a single carrier of larger bandwidth.

16. The receiver as recited in claim 14 wherein the bandwidth extension constitutes multiple separate non-contiguous component carriers.

17. The receiver as recited in claim 14 wherein the bandwidth extension includes common control information that is replicated in all component carriers.

18. The receiver as recited in claim 14 wherein the bandwidth extension includes dedicated control information that occupies only one component carrier.

19. The receiver as recited in claim 14 wherein the bandwidth extension constitutes multiple separate contiguous component carriers.

20. The receiver as recited in claim 14 wherein the bandwidth extension includes common control information that occupies only one component carrier.

21. The receiver as recited in claim 14 wherein the bandwidth extension includes dedicated control information that occupies only one component carrier.

22. A method of operating a receiver, comprising:
  receiving in said receiver a transmission having an increased system bandwidth; and
  applying the increased system bandwidth corresponding to a bandwidth extension over multiple component carriers wherein the bandwidth extension corresponds to a sounding reference signal that is replicated in a portion of the multiple component carriers.

23. The method as recited in claim 22 wherein the bandwidth extension includes common control information that is replicated in all component carriers.

24. The method as recited in claim 22 wherein the bandwidth extension includes dedicated control information that occupies only one component carrier.

25. The method as recited in claim 22 wherein the bandwidth extension includes common control information that occupies only one component carrier.

26. The method as recited in claim 22 wherein the bandwidth extension includes dedicated control information that occupies only one component carrier.

* * * * *